F. SCHORNO.
LOCKING MECHANISM FOR TRANSMISSION GEARING.
APPLICATION FILED OCT. 27, 1908.
915,225.
Patented Mar. 16, 1909.
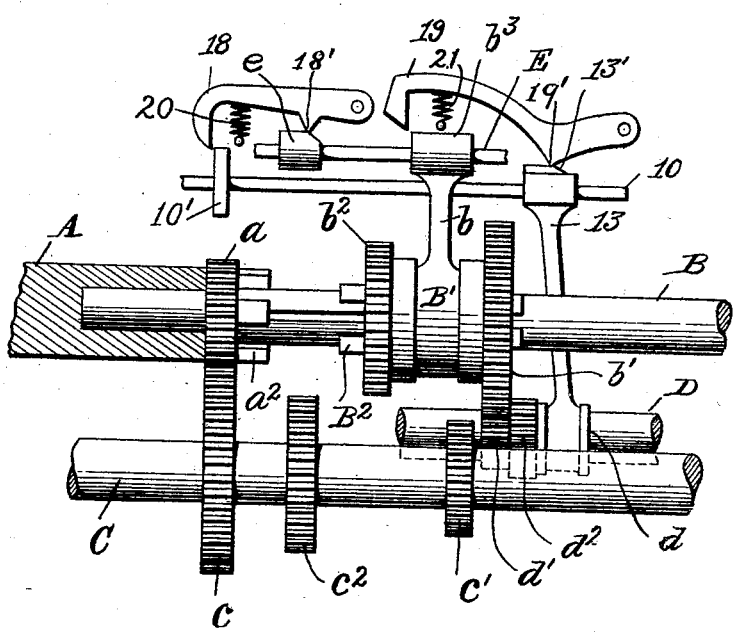

UNITED STATES PATENT OFFICE.

FERDINAND SCHORNO, OF PASSAIC, NEW JERSEY.

LOCKING MECHANISM FOR TRANSMISSION-GEARING.

No. 915,225.  Specification of Letters Patent.  Patented March 16, 1909.

Original application filed July 13, 1908, Serial No. 443,266. Divided and this application filed October 27, 1908. Serial No. 459,697.

*To all whom it may concern:*

Be it known that I, FERDINAND SCHORNO, a citizen of the Republic of Switzerland, residing at Passaic, county of Passaic, State of New Jersey, have invented certain new and useful Improvements in Locking Mechanism for Transmission-Gearing; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This application is a division of my application Serial Number 443,266, filed on or about the 13th day of July 1908.

This invention relates to improvements in locking mechanism for transmission gears and has for its object to provide means for preventing the engagement of the reversing and forward gears simultaneously.

In the accompanying drawings the figure is a plan view of a well known form of transmission gearing having my improved locking mechanism applied thereto.

The type of transmission mechanism shown is of the ordinary three forward speed and one reverse and comprises a power shaft A connected with the motor (not shown) and a shaft B from which the vehicle is driven, said shaft B is centered in shaft A but is normally disconnected therefrom. Fixed on shaft A is gear $a$ in continuous mesh with gear $c$ on secondary shaft C. Splined on shaft B is a collar B' carrying gears $b'$, $b^2$. This collar is moved to the left from the position shown by means of a fork $b$, carried by a shifting rod E connected by suitable means to the usual shifting lever (not shown) mounted at the side of the vehicle. By such movement gear $b'$ will mesh with low gear $c'$ on shaft C and the drive will be through gears $a$, $c$, $c'$, $b'$. A further movement of collar B' to the left will disengage gears $c'$ and $b'$ and gear $b^2$ will be brought into mesh with high gear $c^2$ and the drive will be through gears $a$, $c$, $c^2$, $b^2$. The collar B' carries a clutch member $B^2$ and when said collar is further moved to the left gears $c^2$ $b^2$ will be disengaged and the clutch member $B^2$ will engage a clutch member $a^2$ carried by gear $a$ and shaft B will be driven directly from shaft A.

The reversing mechanism comprises an intermediate shaft D on which is splined a collar $d$ carrying gears $d'$, $d^2$ and when gears $b'$ $b^2$ are in a neutral position, as shown gears $d'$, $d^2$ may be shifted into mesh with gears $c'$, $b'$ respectively.

Any suitable mechanism may be employed for operating the shifting rods E and 10 and when the gears $b'$ $b^2$ are moved to the left from the position shown, a pivoted hook 18 is automatically moved by means of a spring 20 connected to the hook into engagement with a collar 10' on shifting rod 10, thus locking the latter against movement to the left while either of said gears is engaged. To release the collar from hook 18 the rod E must be moved to the right disengaging gears $b'$, $b^2$ whereupon a cam $e$ on rod E will engage a lug 18' on the hook 18 and move the latter away from collar 10'.

When the shifting rod 10 is moved to the left to bring reversing gears $d'$, $d^2$ into mesh, a hook 19 moves under the stress of a spring 21 connected to said hook 19 into engagement with a sleeve $b^3$ on rod E preventing said rod from being moved to the left. When rod 10 is again moved to the right a cam 13' on arm 13 engages the lug 19' on hook 19 and moves the latter away from the sleeve $b^3$.

The operation of my invention has been sufficiently described in connection with the foregoing description of form and arrangement of parts to enable anyone to understand the same.

I claim:

The combination of a plurality of independently shiftable operating rods, a locking member arranged longitudinally of each rod, pivoted at one end and having a hook formed on the other end and a lug intermediate the ends, a locking collar on each rod, springs connected to the locking members adapted to normally hold the hook of one of the locking members in engagement with one of the locking collars, and a single cam on each rod adapted when the rod is moved in one direction to engage an intermediate lug on one of the locking members and move
5 the hook of the latter out of engagement with a locking collar on the other rod.

In testimony that I claim the foregoing as my invention, I have signed my name in presence of two subscribing witnesses.

FERDINAND SCHORNO.

Witnesses:
  M. D. COLLARD,
  FRANK R. ALLEN.